Aug. 23, 1938.  H. HAUSER  2,127,628

FUEL MIXER

Filed Jan. 22, 1938

Inventor

Henry Hauser

By Clarence A. O'Brien
Hyman Berman

Attorneys

Patented Aug. 23, 1938

2,127,628

UNITED STATES PATENT OFFICE 2,127,628

FUEL MIXER

Henry Hauser, Canton, Ohio

Application January 22, 1938, Serial No. 186,444

2 Claims. (Cl. 48—180)

The present invention relates to new and useful improvements in fuel mixers for internal combustion engines and has for its primary object to provide, in a manner as hereinafter set forth, a device of this character comprising novel means, operable by the suction of the engine, for breaking up the particles of fuel and thoroughly mixing said fuel with the air immediately after the charge leaves the carburetor.

Another very important object of the invention is to provide, in a fuel mixer of the type including a suction operated propeller or fan, novel means for directing the charge toward said propeller or fan.

Still another very important object of the invention is to provide a fuel mixer of the character described which is adapted to be expeditiously installed for operation without the necessity of making structural alterations in the carburetor or intake manifold of the engine.

Other objects of the invention are to provide a fuel mixer of the character set forth which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein.

Figure 1:
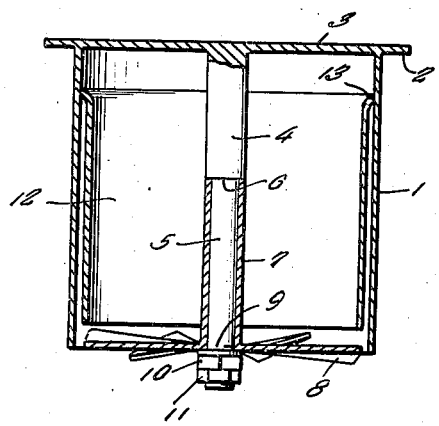
Figure 1 is a view in vertical section through an embodiment of the invention.
Figure 2:
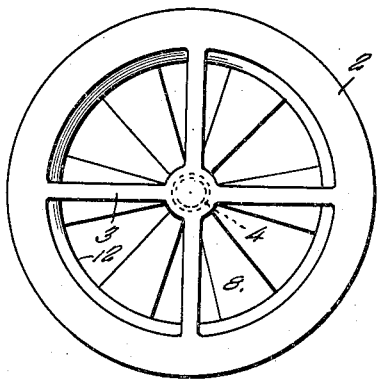
Figure 2 is a top plan view thereof.
Figure 3:
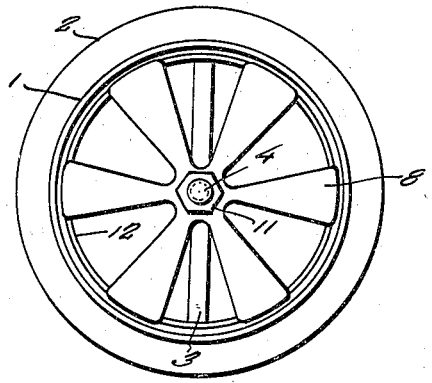
Figure 3 is a view in bottom plan of the device.

Referring now to the drawing in detail, it will be seen that the embodiment of the invention which has been illustrated comprises a cylinder or tube 1 of suitable metal which is adapted to be slipped into the intake manifold of the engine just below the carburetor. The metallic cylinder 1 is open at its ends and said cylinder, at its upper end, is provided with an external flange 2 which is adapted to be secured between the carburetor and the intake manifold.

The cylinder 1 is further provided, on its upper end, with a spider 3. Depending from the spider 3 is a centrally located shaft 4. The lower portion of the shaft 4 is reduced, as at 5, providing a shoulder 6. Journalled on the reduced portion 5 of the shaft 4 is a sleeve 7 having a fan or the like 8 on its lower end. The fan 8 may comprise any suitable number of blades. A suitable thrust bearing 9 is provided below the fan 8. A retaining nut 10 for the fan 8 is threaded on the lower end portion of the shaft 4. A locknut 11 is provided for the nut 10.

Mounted in the cylinder 1 in spaced, concentric relation thereto is a guide or deflector 12 which terminates, at its lower end, adjacent the fan 8, as illustrated to advantage in Fig. 1 of the drawing. The upper end portion of the guide or deflector 12 is flanged or flared, as at 13, and fixed in any suitable manner to the cylinder 1.

It is thought that the operation of the device will be readily apparent from a consideration of the foregoing. With the engine in operation, the charge from the carburetor is drawn downwardly through the cylinder 1 and the fan 8 is thus caused to rotate. The particles of fuel, being struck by the blades of the rapidly rotating fan 8, are broken up thereby and said fuel is thoroughly mixed with the air before reaching the combustion chambers of the engine. The deflector 12 directs the charge toward the fan 8 and prevents any of the particles of fuel from escaping the action of said fan by passing downwardly along the walls of the cylinder 1.

It is believed that the many advantages of a fuel mixer constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:—

1. A fuel mixer comprising a cylinder adapted to be mounted in the intake manifold of an internal combustion engine, said cylinder being open at its ends, a spider on one end of the cylinder, a shaft fixed on said spider and extending centrally through the cylinder, a fan rotatably mounted on the shaft and operable in the other end portion of the cylinder, and a deflector mounted in the cylinder in spaced, concentric relation thereto for directing the fuel toward the fan, one end portion of said deflector being flared and secured to the cylinder, the other end of said deflector being adjacent the fan.

2. A fuel mixer of the character described comprising a cylinder adapted to be mounted in the intake manifold of an internal combustion engine, said cylinder being open at its ends, an attaching flange on one end of the cylinder, a spider on said one end of the cylinder, a shaft fixed on the spider and extending centrally through the cylinder, said shaft comprising a reduced end portion providing a shoulder, a sleeve journalled on the reduced portion of the shaft and having one end engaged with the shoulder, a fan on the other end of the sleeve operable in the other end portion of the cylinder, retaining nuts for the sleeve threaded on the shaft, a thrust bearing for the sleeve interposed between said sleeve and the retaining nuts, and a deflector mounted in the cylinder in spaced, concentric relation thereto for directing the fuel toward the fan, one end of the deflector being adjacent the fan, the other end portion of said deflector being flared and secured to the cylinder.

HENRY HAUSER.